United States Patent

Shintomi

[11] Patent Number: 5,715,414
[45] Date of Patent: Feb. 3, 1998

[54] FOUR-VALUE DATA WIRELESS SIGNAL RECEIVER

[75] Inventor: Yuichi Shintomi, Kyoto, Japan

[73] Assignee: Rohm Co., Ltd., Kyoto, Japan

[21] Appl. No.: 670,691

[22] Filed: Jun. 26, 1996

[30] Foreign Application Priority Data

Jun. 27, 1995 [JP] Japan ................. 7-160254
Jun. 27, 1995 [JP] Japan ................. 7-160255

[51] Int. Cl.$^6$ .................. H04L 27/14; H04L 25/34
[52] U.S. Cl. .................. 375/334; 375/286; 455/38.4; 455/310
[58] Field of Search .................. 455/31.3, 37.1, 455/38.3, 59, 150.1, 38.1, 38.4, 38.5, 67.1, 226.1, 296, 303, 304, 305, 310; 375/286, 334, 335, 360, 264; 340/825.44, 311.1, 825.71, 825.73; 329/300, 303

[56] References Cited

U.S. PATENT DOCUMENTS

| | | |
|---|---|---|
| 3,854,099 | 12/1974 | Kratt, 3rd et al. |
| 4,481,675 | 11/1984 | Ichikawa et al. ............ 455/38.3 |
| 4,529,941 | 7/1985 | Lipoff ................. 375/334 |
| 4,568,883 | 2/1986 | Shindley ............... 375/334 |
| 5,241,702 | 8/1993 | Dent .................. 455/303 |
| 5,285,165 | 2/1994 | Renfors et al. ............. 455/303 |
| 5,586,147 | 12/1996 | Kreuzgruber et al. . |

Primary Examiner—Chi H. Pham
Assistant Examiner—Gertrude Arthur
Attorney, Agent, or Firm—Nikaido, Marmelstein, Murray & Oram LLP

[57] ABSTRACT

A pager is provided with a differentiator circuit and an integrator or a comparator circuit. The differentiator circuit turns received four-value analog signals into signal level variations. In a construction with an integrator circuit, the signal level variations are integrated and expanded to become pulse signals having widths proportional to the signal level variations. The levels of the pulse signals are determined according to the directions of the signal level variations. Four values are distinguished based on a known value of a synchronizing signal and the levels and widths of the pulse signals. In a construction with a comparator circuit, the signal level variations are compared with six reference levels and classified into seven classes by the comparator circuit, so that four values are distinguished based on the known value of the synchronizing signal and the classified level variations.

5 Claims, 8 Drawing Sheets

FOUR-VALUE DATA WIRELESS SIGNAL RECEIVER

BACKGROUND OF THE INVENTION

1. Field of the Invention

The present invention relates to a receiver for receiving four-value wireless signals, and particularly to a pager for receiving four-value wireless signals.

2. Description of the Prior Art

Since paging services were started, the number of their users has been constantly increasing, and a large number of pagers, which are receiver terminals, are used nowadays. In the current paging services, two-value signals are used for communication. However, the rapid spread of pagers are giving rise to problems associated with scarcity of radio wave resources.

To solve this problem, development of new-generation pagers that communicate with four-value signals has been under study in order to increase communication throughput. In contrast to two-value signals, which convey one bit of information each, four-value signals convey two bits of information each. Accordingly, the use of four-value signals doubles the amount in total of communicated information. In new-generation paging services, information is communicated by use of frequency shift keying (FSK) signals containing both two-value and four-value signals in order to keep compatibility with conventional systems.

Figure 1:
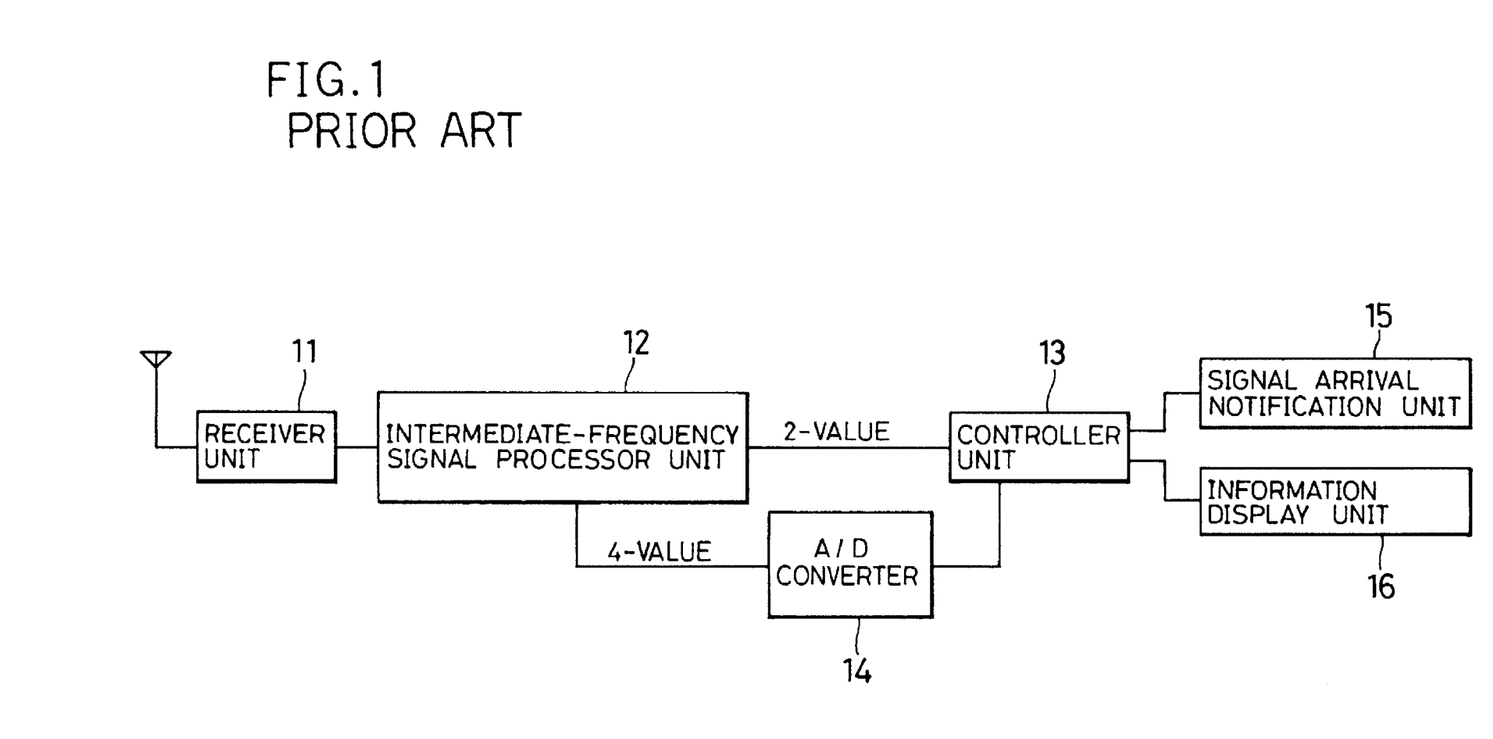
FIG. 1 is a block diagram showing the outline of the construction of a conventional pager.

FIG. 1 shows the outline of the construction of a pager for receiving FSK signals containing four-value signals. FSK signals, which are carried on a radio-frequency wave, are converted into intermediate-frequency signals and amplified in a receiver unit 11. An intermediate-frequency signal processor unit 12 distinguishes the levels of the resultant analog signals by use of a comparator which is not shown in the figure, and outputs distinction results, which are two-value signals, to a controller unit 13. The intermediate-frequency signal processor unit 12 outputs the analog signals to an A/D converter 14, so that the A/D converter 14 converts the received signals into four-value digital signals and outputs the digital signals to the controller unit 13. The controller unit 13 processes the received signals according to a predetermined procedure, and, when the received data are identified as being addressed to the pager, the controller unit 13 notifies the user of signal arrival by means of a signal arrival notification unit 15, which rings or vibrates, and the controller unit 13 displays the information of the received data in a information display unit 16 as well.

The analog signals outputted from the intermediate-frequency processor unit 12 to the A/D converter 14 are stepped waves having a voltage of around 150 to 200 mV, but offsets included in these output voltage vary according to ambient temperature, battery level, and radio wave signal intensity. For this reason, the A/D converter 14 for reading four-value stepped-wave signals is required to have a resolution as high as 8 bits. This increases both the number of component devices and costs.

Moreover, since a pager is supposed to be carried around by its user, it is expected to be made compact by forming its circuits as IC's. However, since a high-resolution A/D converter is susceptible to noise such as that from a clock, incorporation of such an A/D converter into an IC of the controller unit requires high-level techniques.

SUMMARY OF THE INVENTION

An object of the present invention is to provide a receiver equipped with a simple circuit for converting four-value analog signals into digital signals reliably without being affected by a variation of the offset included in signal levels and, in particular, to provide a pager in which a four-value signal converter circuit is integrated into an IC together with a controller circuit.

To achieve the above object, according to the present invention, a receiver for receiving an FSK wireless wave carrying a reference signal representing a predetermined value and four-value signals succeeding the reference signal comprises a signal extraction circuit for extracting signals from the FSK wireless wave, a differentiator circuit for differentiating signals succeeding the reference signal that are contained in signals extracted by the signal extraction circuit in order to output differentiated signals, an integrator circuit for integrating the differentiated signals to output pulse signals having widths proportional to magnitudes of the differentiated signals and having levels corresponding to signs of the differentiated signals, and a signal value distinction means for distinguishing values of the signals based on the widths and the levels of the pulse signals and the value of the reference signal.

The signals succeeding the reference signal that are extracted by the signal extraction circuit from the FSK wave are successively differentiated by the differentiator circuit to be turned into relative levels, each of which is a variation relative to the level of the immediately preceding signal. In this process, offsets included in the levels of the signals are removed.

The integrator circuit integrates the differentiated signals to convert them into pulse signals having levels corresponding to the signs of the differentiated signals, and outputs the resultant pulse signals. For example, depending on whether the sign is positive or negative, a pulse signal has either a high level (H-level) or a low level (L-level), or reversely, the pulse signal has either a L-level or a H-level. The integrator circuit also makes the width of a pulse signal proportional to the magnitude of the differentiated signal. Accordingly, the level of a pulse signal represents an increase or decrease in the level of the received signal, and the width of the pulse signal represents the magnitude of a change in the level of the received signal.

Since the value of the reference signal is predetermined, the signal value distinction means distinguishes the values of the remaining signals based on the value of the reference signal and the widths and the levels of the pulse signals. First, the value of the signal immediately succeeding the reference signal is distinguished, and then, based on the resultant value, the value of the next signal is distinguished. Thus, the values of the signals are successively distinguished one by one.

To achieve the above object, according to the present invention, in another receiver for receiving a wireless signal including a reference signal representing a predetermined value and a succession of four-value signals succeeding the reference signal, the succession of signals succeeding the reference signal is differentiated to determine signal level variations, the signal level variations are classified into seven classes ranging from −3 to +3 and successively accumulated, and resultant accumulated values are added to the value of the reference signal in order to determine values of the succession of signals.

The succession of received signals succeeding the reference signal is differentiated and turned into signal level variations, each of which is a variation relative to the level of the immediately preceding signal. In this process, offsets included in the signal levels are removed. The signal level variations are then classified into seven classes ranging from −3 to +3. By accumulating the classified values successively after reception of the reference signal, the relative level of each signal with respect to the level of the reference signal is obtained. By adding the relative level to the known value of the reference signal, an absolute value of each signal is obtained.

To achieve the above object, according to the present invention, still another receiver for receiving an FSK wireless wave carrying a reference signal representing a predetermined value and four-value signals succeeding the reference signal comprises a signal extraction circuit for extracting signals from the FSK wireless wave, a differentiator circuit for differentiating signals succeeding the reference signal that are contained in signals extracted by the signal extraction circuit in order to output differentiated signals, six comparator circuits each having a different reference level for comparing levels of the differentiated signals with the reference level to output signals having either of two levels depending on results of the comparison, and a signal value distinction means for distinguishing values of the signals based on outputs from the six comparator circuits and the value of the reference signal.

The signals succeeding the reference signal that are extracted by the signal extraction circuit from the FSK wave are successively differentiated by the differentiator circuit to be turned into relative levels, each of which is a variation relative to the level of the immediately preceding signal. In this process, offsets included in the levels of the signals are removed.

The comparator circuits then compare the obtained relative levels with reference levels in order to determine whether each value is greater or smaller than each of the reference levels. Since there are six comparator circuits and each has a reference value different from that of the others, the relative levels resulting from the differentiation are classified into seven classes ranging from a class for levels lower than the lowest reference level to a class for levels higher than the highest reference level.

Since the value of the reference signal is known, the signal value distinction means distinguishes the value of a signal based on the value of the reference signal and the relative level of the class into which the value is classified. The value of the signal immediately succeeding the reference signal is determined based on the value of the reference signal and the relative level of the signal itself with respect to the reference signal. Similarly, the value of another signal is determined based on the value of the immediately preceding signal and the relative value of the signal itself with respect to the immediately preceding signal. In this way, the values of the signals are successively determined one by one.

It is possible to form a receiver as described above as a pager by further providing it with a judging means for judging whether or not signals are addressed to the pager based on an identification signal carried on the FSK wireless wave, a signal arrival notification means for notifying signal arrival with ringing, light emission, vibration or a combination thereof when the signals are identified as being addressed to the pager by the judging means, and a display means for displaying received signals.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 2:
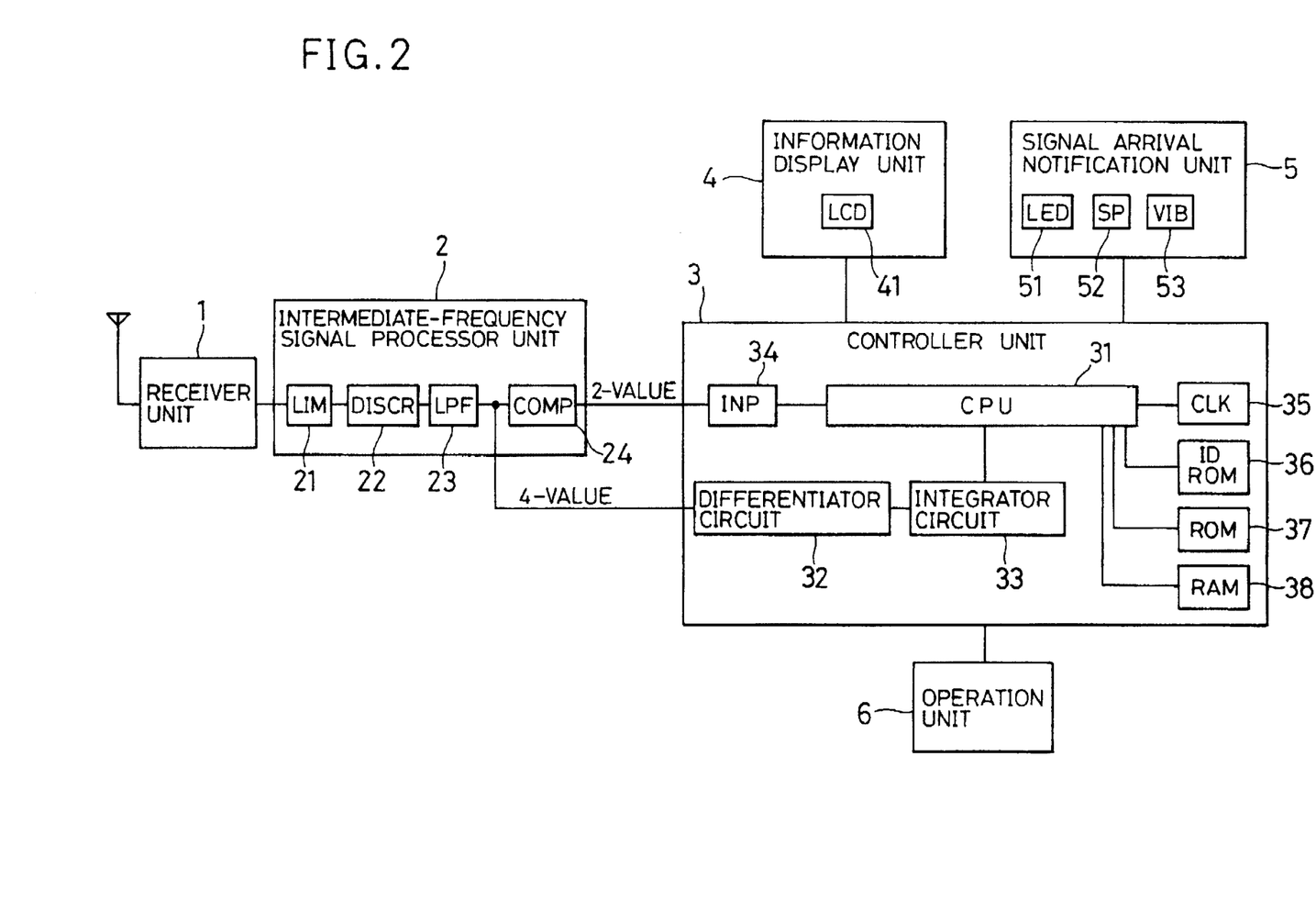
FIG. 2 is a block diagram showing the outline of the construction of a pager according to the first embodiment of the present invention.

Hereinafter, a first embodiment of the present invention will be described with reference to the drawings. FIG. 2 is a block diagram showing the outline of the construction of a pager for receiving FSK wireless signals containing two-value and four-value signals. The pager comprises a receiver unit 1, an intermediate-frequency signal processor unit 2, a controller unit 3, an information display unit 4, a signal arrival notification unit 5, and an operation unit 6.

The receiver unit 1 selects signals existing within a predetermined frequency band out of a radio-frequency FSK wireless wave received through an antenna, converts the selected signals into intermediate-frequency signals, and amplifies and outputs the converted signals. The intermediate-frequency signal processor unit 2 comprises a limiter 21, a detection circuit 22, a low-pass filter 23 and a comparator 24. The intermediate-frequency signals outputted from the receiver unit 1 are subjected to amplitude limitation by the limiter 21, to signal detection by the detection circuit 22, and then to removal of unnecessary frequency ingredients by the low-pass filter 23. The output of the low-pass filter 23 is fed to the comparator 24 and to the controller unit 3.

The comparator 24 compares the levels of the inputted signals with a predetermined reference level to output signals having either a H-level or a L-level to the controller unit 3 according to the comparison results. Thus, distinction between two values is achieved with the comparator 24 which distinguishes between these two levels.

The controller unit 3 is provided with a central processing unit (CPU) 31, a differentiator circuit 32, an integrator circuit 33, and an input circuit 34. A clock 35, an ID-ROM 36, a ROM 37, and a RAM 38 are connected to the CPU 31. The output of the comparator 24 in the intermediate-frequency processor unit 2 is fed to the CPU 31 through the input circuit 34. The differentiator circuit 32 and the integrator circuit 33 are for distinguishing between four values, and will be described later in detail.

The ROM 37 contains a program for the CPU 31, and the CPU 31 performs a control procedure according to this program. The ID-ROM 36 contains an identification code unique to the pager. The CPU 31 compares the pager identification code included in the received data with the identification code stored in the ID-ROM 36, in order to determine whether the received data are addressed to the pager or not. The received data are temporarily stored in the RAM 38.

The information display unit 4 is provided with a liquid crystal display device 41, in which the controller unit 3 displays the received data. The signal arrival notification unit 5 is provided with a light emitting diode 51, a speaker 52, and a vibrator 53, so that the controller unit 3 notifies the user of signal arrival with light emission, ringing, or vibration when data addressed to the pager have arrived. The operation unit 6 is provided with switches which are not shown in the figure. With theses switches, the user can switch the contents of data displayed in the information display unit 4, and can switch the manner of signal arrival notification by the signal arrival notification unit 5. The signal arrival notification unit 5 performs notification by one or a combination of light emission, ringing, and vibration.

Table 1 shows examples of FSK frequencies of two-value and four-value signals transmitted in the new-generation paging services. As is evident from the table, the frequencies for the four-value signal are allotted to decimal values of "0", "1", "3" and "2" from the lowest frequency. The frequency of the value "0" in the two-value signal is identical with that of the value "00" in the four-value signal, and the frequency of the value "1" in the two-value signal coincides with that of the value "10" ("2" in decimal notation) in the four-value signal. Signals as described above are transmitted in the new-generation paging services.

TABLE 1

|  | Value | Frequency Shift |
| --- | --- | --- |
| 2-value Signal | "1" | +4.8 kHz |
|  | "0" | −4.8 kHz |
| 4-value Signal | "10" | +4.8 kHz |
|  | "11" | +1.6 kHz |
|  | "01" | −1.6 kHz |
|  | "00" | −4.8 kHz |

Figure 8A:
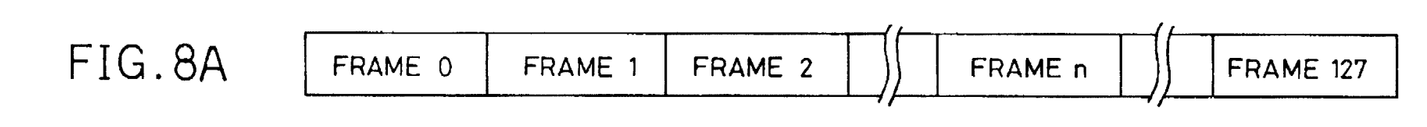
FIGS. 8A and 8B are diagrams showing an example of the construction of data transmitted in new-generation paging services.
Figure 8B:
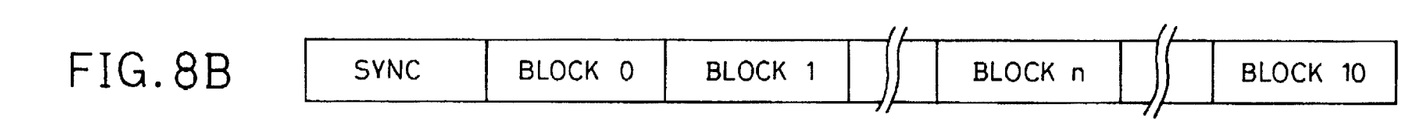

FIGS. 8A and 8B show an example of the structure of data transmitted in the new-generation paging services. As shown in FIG. 8A, a string of 128 frames, each having a fixed length, composes one cycle, and 15 cycles, designated as 0 to 14, are transmitted per hour. The time needed for transmitting one frame is 1.875 seconds. Since the cycle 0 is transmitted every hour on the hour, the pager can correctly recognize the time. Each frame consists, as shown in FIG. 8B, of a synchronizing signal that heads the frame, and 11 blocks succeeding it. The synchronizing signal has a predetermined pattern of −4.8 kHz and 4.8 kHz signals. These signals correspond to "0" and "1" in the two-value signal, and "00" and "10" in the four-value signal. A set of values corresponding to the pattern of the synchronizing signal have been stored in the ROM 37 so that the CPU 31 recognizes reception of the synchronizing signal by comparing the signal values. The succeeding blocks include a pager identification code representing the pager to which the frame is addressed, and four-value data to be transmitted.

The pager as shown in FIG. 2, when it receives FSK signals constructed as described above, always distinguishes between two values by means of the comparator 24 in the intermediate frequency signal processor unit 2, and, in addition, always distinguishes between four values by providing the output of the low-pass filter 23 to the differentiator circuit 32 of the controller unit 3.

Figure 3:
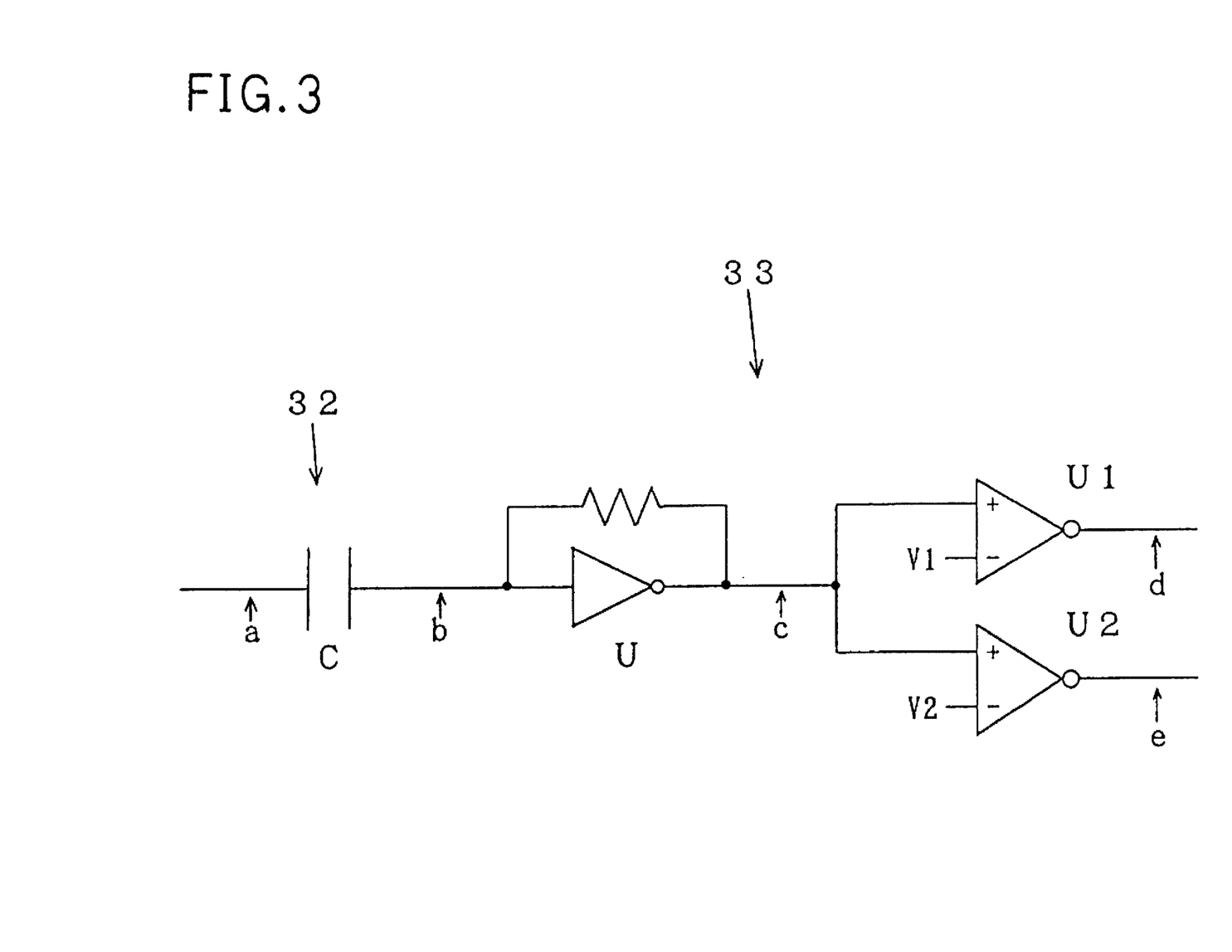
FIG. 3 is a diagram showing the construction of differentiator and integrator circuits for distinguishing between four values in the pager according to the first embodiment of the present invention.

FIG. 3 shows the differentiator circuit 32 and the integrator circuit 33 for distinguishing between four values in the controller unit 3. The differentiator circuit 32 consists of a capacitor C. The integrator circuit 33 consists of an amplifier U and two comparators U1 and U2. The waveforms of the signals at the points a, b, c, d and e in FIG. 3 are shown in FIGS. 4A to 4E, respectively. The figures show a case where a succession of six four-value signals S1 to S6 having values "00", "10", "01", "11", "00" and "01" (in decimal notation, "0", "2", "1", "3", "0" and "1") is inputted in this order.

Figure 4A:
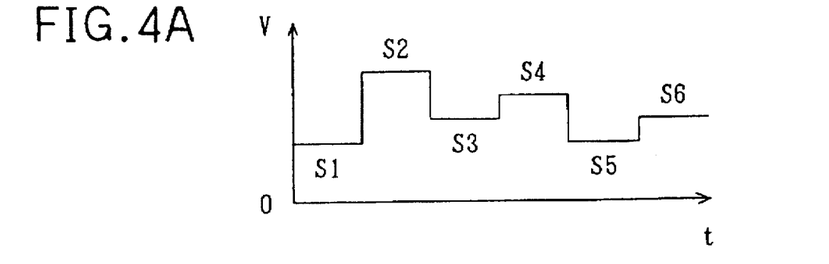
FIGS. 4A to 4E are diagrams showing examples of waveforms of the input and output signals of the differentiator and integrator circuits in the pager according to the first embodiment of the present invention.
Figure 4B:
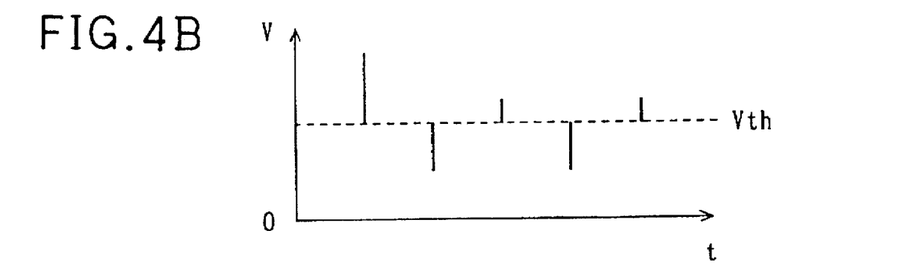
Figure 4C:
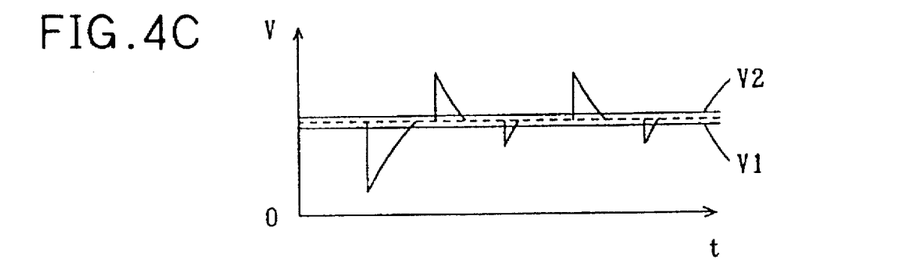

The differentiator circuit 32 receives stepped-wave signals as shown in FIG. 4A from the low-pass filter 23. These signals are DC-coupled by the capacitor C so that offsets included in the signals are removed. At the output of the capacitor C, the signals have waveforms as shown in FIG. 4B, each representing a relative variation with respect to the preceding signal. The amplifier U of the integrator circuit 33 amplifies the differentiated signals as shown in FIG. 4C. In this process, the levels of the signals are reversed, and the signals are expanded in proportion to the magnitudes of the differentiated signals.

The comparators U1 and U2 are fed with reference-level voltages V1 and V2 shown in FIG. 4C, respectively. More specifically, the comparator U1 has a reference level voltage V1, which is slightly lower than the theoretical threshold voltage Vth of the amplifier U but higher than the level of the differentiated wave of a stepped-wave signal having a one-step lower level, whereas the comparator U2 has a reference level voltage V2, which is slightly higher than the theoretical threshold voltage Vth of the amplifier U but lower than the level of the differentiated wave of a stepped-wave signal having a one-step higher level.

Figure 4D:
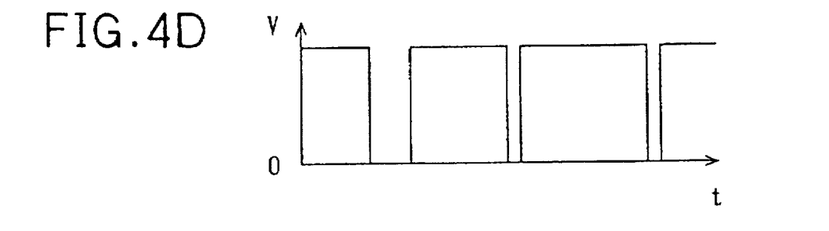
Figure 4E:
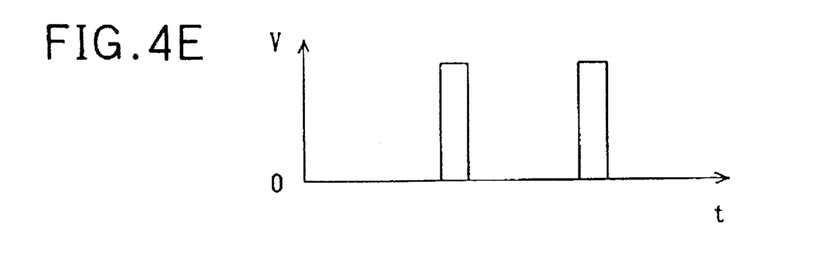

Both comparators U1 and U2 compares the voltage of an input signal with their own reference level voltage, and hold their output at a H-level, if the input signal voltage is higher than the reference level, or at a L-level, if the input signal voltage is lower than the reference level. Accordingly, the outputs of the comparators U1 and U2 are obtained as pulse signals as shown in FIGS. 4D and 4E. In these pulse signals, the pulse width is approximately proportional to the magnitude of the differentiated signal, since the reference-level voltages V1 and V2 are only slightly different from the theoretical threshold voltage Vth of the amplifier U. The comparator U1 outputs a H-level when a signal does not exist, and a L-level when a signal exists. In contrast, the comparator U2 outputs a H-level when a signal exists, and a L-level when a signal does not exist. The outputs of the comparators U1 and U2 are supplied to the CPU 31.

The CPU 31 reads in the signals from U1 and U2 separately. In this process, the CPU judges, when it receives a L-level from the comparator U1, that the received signal increased (changed positively), and, when it receives a H-level from the comparator U2, that the received signal decreased (changed negatively).

Moreover, the CPU 31, while reading in the signals from the comparators U1 and U2, measures the time required for reading in each pulse based on the output of the clock 35 in order to detect the width of the pulse. The detected pulse width is then classified into one of four levels 0, 1, 2 or 3 through comparison with three predetermined values. In this process, signal level variations due to level variations in the received signals and due to errors included in the outputs of the differentiator circuit 32 or the integrator circuit 33 are removed, so that a pulse width represents a variation in the signal level correctly.

The resultant variations in the signal levels, however, do not directly represent variations in the signal values. As shown in Table 1, since the order of the four values does not coincide with that of the frequencies, variations in the signal level do not correspond one-to-one to variations of the value among the four values. For example, although a variation of the signal value from "00" to "01" is +1 and a variation of the signal value from "11" to "10" is −1, both variations correspond to a positive one-level variation in the signal level.

However, when the value of the preceding signal is known, it is possible to determine the correspondence between variations in the signal levels and specific variations in the signal values. In the example above, where the values of the preceding signals are "00" and "11", if these values are known, it is also known that a positive one-level variation in the signal level reflects variations of +1 and −1 in the signal value, respectively.

As described earlier, a synchronizing signal is recorded at the head of each block of a received frame, and the value of the synchronizing signal is known beforehand. The CPU 31 therefore distinguishes the values of the signals succeeding the synchronizing signal based on the value of the synchronizing signal and the level variations in the signals from the comparator 24.

More specifically, the CPU 31, based on the value of the last signal of the synchronizing signal (either "00" or "10" in four-value notation), first determines the signal value variation corresponding to the signal level variation of the succeeding signal, and then adds the obtained signal value variation to the value of the last signal of the synchronizing signal in order to determine the value of the signal immediately succeeding the synchronizing signal. In the same manner, the value of the next signal is determined based on the already known value of the immediately proceeding signal and the signal level variation. Therefore, if we assume that the value of the synchronizing signal is represented by A0, the value of the nth signal after the synchronizing signal by An, and the value variation of the j'th signal with respect to the (j−1)'th signal by Dj, then the CPU 31 is supposed to determine the value An, which is one of the four values, of the nth signal according to Expression 1 below:

$$An = A0 + \sum_{j=1}^{n} Dj \qquad (1)$$

The value A0, which is used as a reference, of the synchronizing signal is stored in the ROM 37, that is, it is not determined based on the absolute level of a received signal. The signal value variation Dj is determined based on a relative difference between signal levels. Accordingly, since the value determined according to Expression 1 does not reflect the absolute level of the signal, it always gives a correct value, without being affected by a variation in the offset included in the signal level, even if there are any such variation.

If the order of the frequencies is set so as to correspond to the order of the four values, it is not necessary to determine the variation of each signal value based on the value of the preceding signal, since the variations of the signal levels correspond one-to-one to the variations of the signal values. In this case, four values can be distinguished more easily.

Figure 5:
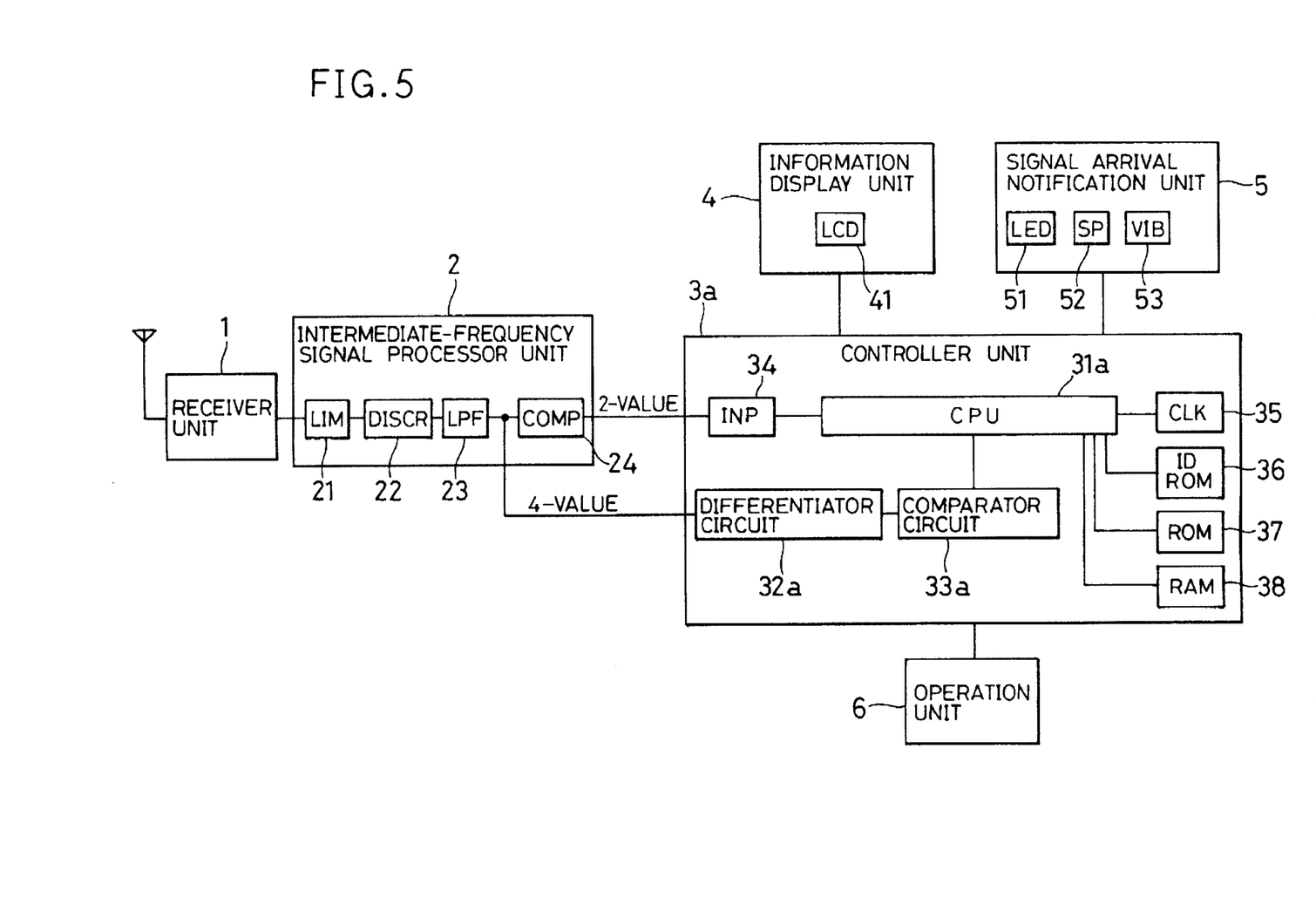
FIG. 5 is a block diagram showing the outline of the construction of a pager according to the second embodiment of the present invention.

Hereinafter, a second embodiment of the present invention will be described with reference to the drawings. A pager of this embodiment is also used for receiving the FSK wireless signals containing two-value and four-value signals as described above. FIG. 5 is a block diagram showing the outline of the construction of the pager. The pager comprises a receiver unit 1, an intermediate-frequency signal processor unit 2, a controller unit 3a, an information display unit 4, a signal arrival notification unit 5, and an operation unit 6. Of these components, the receiver unit 1, the intermediate-frequency signal processor unit 2, the information display unit 4, the signal arrival notification unit 5, and the operation unit 6 have the same construction and functions as those of the first embodiment. Therefore, no description will be given as to these components.

The controller unit 3a comprises a central processing unit (CPU) 31a, a differentiator circuit 32a, a comparator circuit 33a, an input circuit 34, a clock 35, an ID-ROM 36, a ROM 37, and a RAM 38. Of these components, the components other than the CPU 31a, the differentiator circuit 32a and the comparator circuit 33a have the same construction and functions as the components corresponding thereto in the first embodiment.

Figure 6:
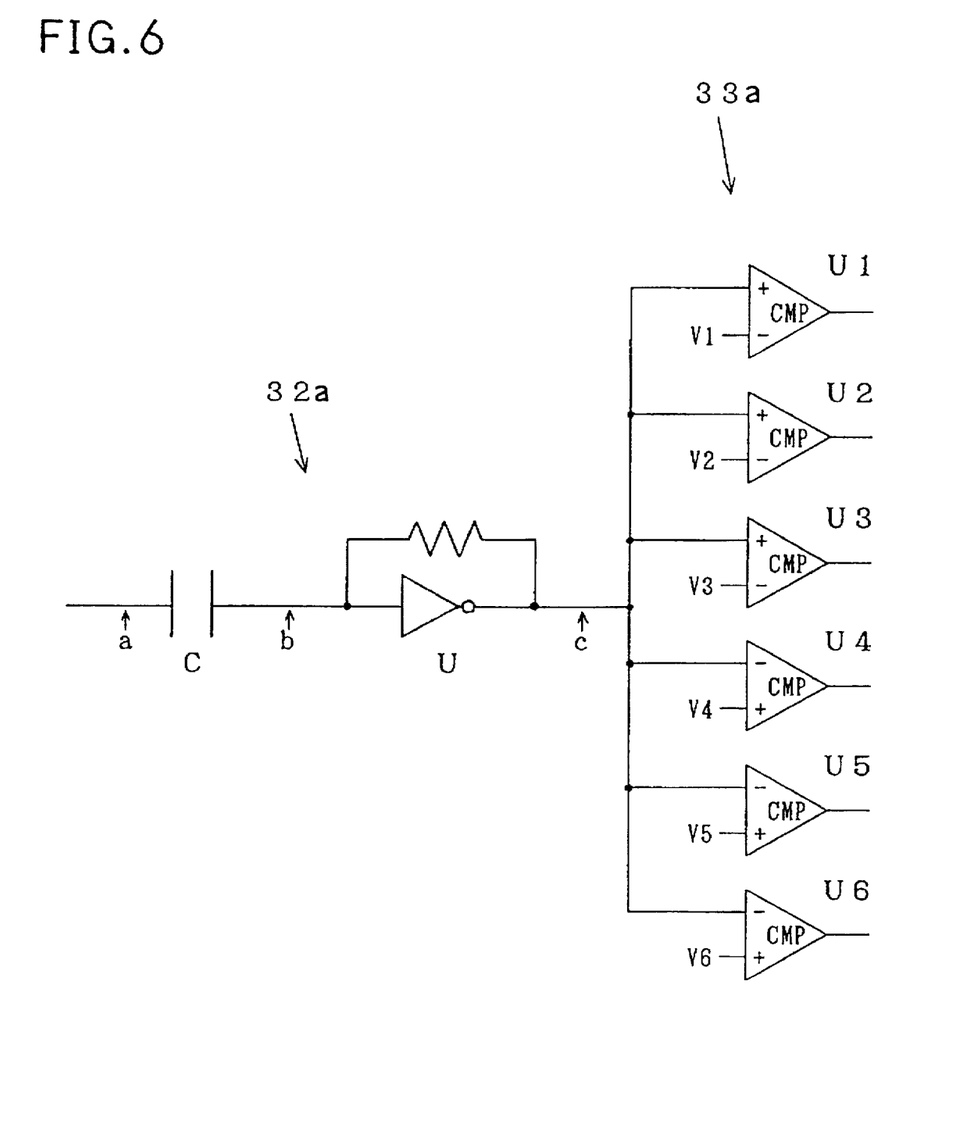
FIG. 6 is a diagram showing the construction of differentiator and comparator circuits for distinguishing between four values in the pager according to the second embodiment of the present invention.
Figure 7A:
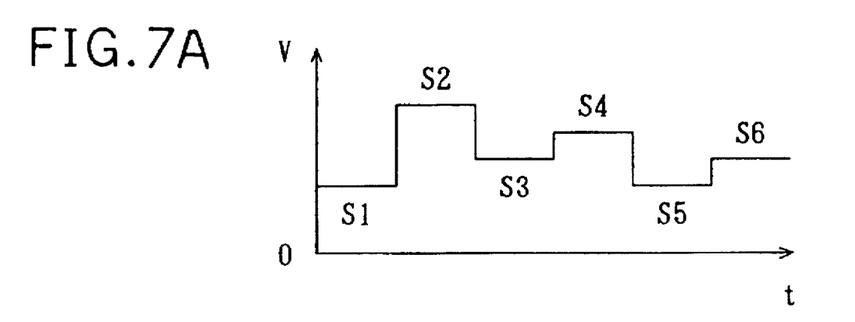
FIGS. 7A to 7C are diagrams showing examples of waveforms of the input and output signals of the differentiator and comparator circuits in the pager according to the second embodiment of the present invention.
Figure 7B:
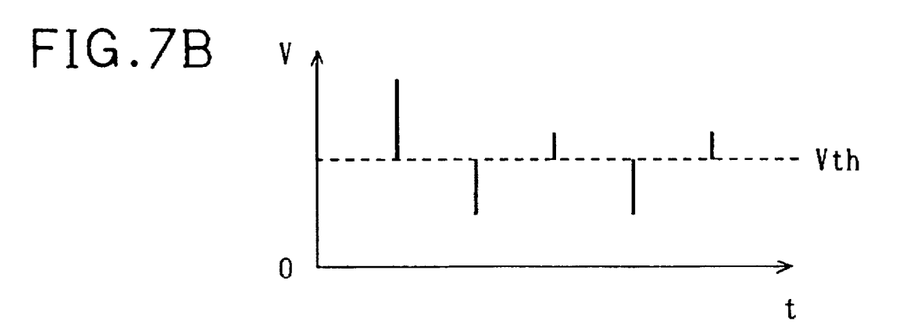
Figure 7C:
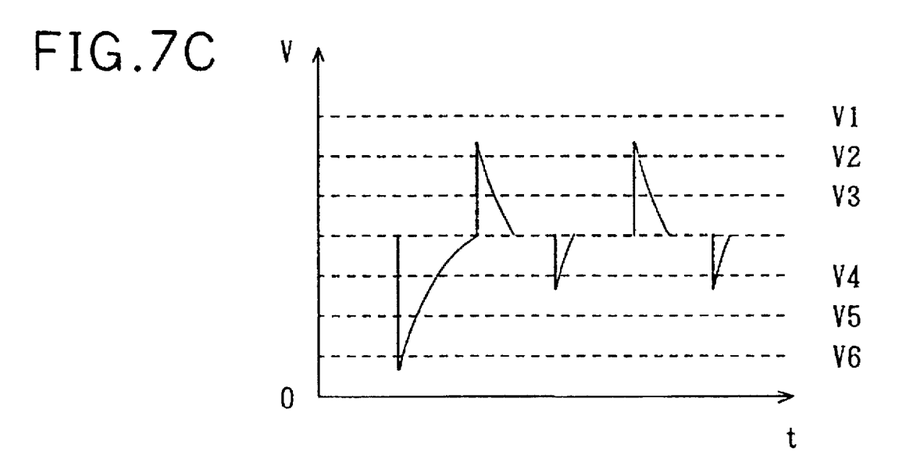

FIG. 6 shows the differentiator circuit 32a and the comparator circuit 33a of the controller unit 3a. The differentiator circuit 32a consists of a capacitor C and an amplifier U. The comparator circuit 33a is constituted of six comparators U1 to U6. The waveforms of the signals at the points a, b, and c in FIG. 6 are shown in FIGS. 7A, 7B and 7C, respectively. The figures show a case where a succession of six four-value signals S1 to S6 having values "00", "10", "01", "11", "00" and "01" (in decimal notation, "0", "2", "1", "3", "0" and "1") is inputted in this order.

The differentiator circuit 32a receives stepped-wave signals as shown in FIG. 7A from the low-pass filter 23. These signals are DC-coupled by the capacitor C, so that offsets included in the signals are removed. At the output of the capacitor C, the signals have waveforms as shown in FIG. 7B, each representing a relative variation with respect to the preceding signal. The amplifier U amplifies the differentiated signals as shown FIG. 7C.

The comparators U1 to U6 of the comparator circuit 33a are fed with reference-level voltages V1 to V6 shown in FIG. 7C, respectively. More specifically, the comparators U1, U2 and U3 have reference level voltages V1, V2 and V3, which are higher than the theoretical threshold voltage Vth of the amplifier U but lower than the level of the differentiated wave of the stepped-wave signal having a three-step, two-step and one-step higher level, respectively; whereas the comparators U4, U5 and U6 have reference level voltages V4, V5 and V6, which are lower than the theoretical threshold voltage Vth of the amplifier U but higher than the level of the differentiated wave of the stepped-wave signal having a one-step, two-step and three-step higher level, respectively. As shown in FIG. 6, the two terminals of the comparators U1 to U6, one for receiving the output of the amplifier U and the other for receiving the reference level voltage, are reversely allocated between in the comparators U1 to U3 and in the comparators U4 to U6.

Each of the comparators U1 to U6 compares the voltage of an input signal with the reference level voltage of the comparator itself, and outputs either a H-level or a L-level depending on whether the voltage of the input signal is higher or lower than the reference voltage. Table 2 shows the outputs of the comparator circuit 33a for the signals S2 to S6 shown in FIG. 7A.

When a positive change is detected in the levels of the received signals, all of the comparators U1 to U3 output a L-level, whereas some of the comparators U4 to U6 output a H-level according to the amount of variation. In contrast, when a negative change is detected in the levels of the received signals, all of the comparators U4 to U6 output a L-level, whereas some of the comparators U3, U2 and U1 output a H-level according to the amount of variation. When no change is detected in the signal levels, all of the comparators U1 to U6 output a L-level. The outputs of the comparators U1 to U6 are supplied to the CPU 31a.

TABLE 2

|    | S2 | S3 | S4 | S5 | S6 |
|----|----|----|----|----|----|
| U1 | L  | L  | L  | L  | L  |
| U2 | L  | H  | L  | H  | L  |
| U3 | L  | H  | L  | H  | L  |
| U4 | H  | L  | H  | L  | H  |
| U5 | H  | L  | L  | L  | L  |
| U6 | H  | L  | L  | L  | L  |

The received signals are thus turned into variations in the signal levels by the differentiator circuit 32a, classified into seven classes by the comparator circuit 33a, and then supplied to the CPU 31a.

The CPU 31a distinguishes four values included in the received signals according to Expression 1 shown above. More specifically, the CPU 31a, based on the value of the last signal of the synchronizing signal, first determines the signal value variation corresponding to the signal level variation of the succeeding signal, and then adds the obtained signal value variation to the value of the last signal of the synchronizing signal in order to determine the value of the signal immediately succeeding the synchronizing signal. In the same manner, the value of the next signal is determined based on the already known value of the immediately proceeding signal and the signal level variation. In this way, all the signals are distinguished between four values.

As described in the above explanation of the two embodiments, in a receiver according to the present invention, a received four-value signal is differentiated so as to represent a level relative to the immediately preceding signal. In this process, an offset included in the signal level is removed. As a result, it is possible to distinguish the signal values correctly without being affected by a variation in the signal level offset, even if there are any such variation. Moreover, as shown in FIGS. 3 and 6, the differentiator circuits 32 and 32a, the integrator circuit 33, and the comparator circuit 33a have a simple construction, and are insusceptible to noise. These circuits therefore can be easily integrated into a single chip together with a CPU. As a result, it is possible to simplify the construction of the receiver, and to make the receiver compact and lightweight.

The advantages described above are more remarkable when the above construction is applied to a pager that is supposed to be carried around by its user. Such a pager is compact, lightweight, and accordingly easy to carry around. In addition, it can correctly distinguish between four values even under the influence of a signal level variation due to carrying.

The methods presented in the above explanation of the embodiments can be applied to apparatuses for receiving multiple-value signals other than four-value signals.

What is claimed is:

1. A receiver for receiving an FSK wireless wave carrying a reference signal representing a predetermined value and four-value signals succeeding said reference signal, comprising:

a signal extraction circuit for extracting signals from the FSK wireless wave;

a differentiator circuit for differentiating signals succeeding said reference signal that are contained in signals extracted by said signal extraction circuit in order to output differentiated signals;

an integrator circuit for integrating said differentiated signals to output pulse signals having widths proportional to magnitudes of the differentiated signals and having levels corresponding to signs of the differentiated signals; and a signal value distinction means for distinguishing values of the signals based on the widths and the levels of said pulse signals and the value of said reference signal.

2. A receiver as claimed in claim 1, formed as a pager, comprising:

a judging means for judging whether or not the signals are addressed to the pager based on an identification signal carried by said FSK wireless wave for identifying a receiver;

a signal arrival notification means for notifying signal arrival with ringing, light emission, vibration or a combination thereof when the signals are identified as being addressed to the pager by said judging means; and a display means for displaying received signals.

3. A receiver for receiving a wireless signal including a reference signal representing a predetermined value and a succession of four-value signals succeeding said reference signal, wherein the succession of signals succeeding said reference signal is differentiated to determine signal level variations, said signal level variations are classified into seven classes ranging from −3 to +3 and successively accumulated, and resultant accumulated values are added to the value of said reference signal in order to determine values of said succession of signals.

4. A receiver for receiving an FSK wireless wave carrying a reference signal representing a predetermined value and four-value signals succeeding said reference signal, comprising:

a signal extraction circuit for extracting signals from the FSK wireless wave;

a differentiator circuit for differentiating signals succeeding said reference signal that are contained in signals extracted by said signal extraction circuit in order to output differentiated signals;

six comparator circuits each having a different reference level for comparing levels of said differentiated signals with said reference level to output signals having either of two levels depending on results of the comparison; and a signal value distinction means for distinguishing values of the signals based on outputs from said six comparator circuits and the value of said reference signal.

5. A receiver as claimed in claim 4, formed as a pager, comprising:

a judging means for judging whether or not the signals are addressed to the pager based on an identification signal carried by said FSK wireless wave for identifying a receiver;

a signal arrival notification means for notifying signal arrival with ringing, light emission, vibration or a combination thereof when the signals are identified as being addressed to the pager by said judging means; and a display means for displaying received signals.

* * * * *